United States Patent
Lenzo

(10) Patent No.: US 10,372,021 B2
(45) Date of Patent: Aug. 6, 2019

(54) TRIPLE AXIS MAGNETIC ACTUATOR THROUGH NON-METALLIC SUBSTRATE

(71) Applicant: Anthony S Lenzo, Astoria, NY (US)

(72) Inventor: Anthony S Lenzo, Astoria, NY (US)

( * ) Notice: Subject to any disclaimer, the term of this patent is extended or adjusted under 35 U.S.C. 154(b) by 602 days.

(21) Appl. No.: 14/587,100

(22) Filed: Dec. 31, 2014

(65) Prior Publication Data

US 2016/0187762 A1    Jun. 30, 2016

(51) Int. Cl.
*G03B 17/08*    (2006.01)
*H01F 7/02*    (2006.01)
*H04N 5/225*    (2006.01)

(52) U.S. Cl.
CPC .......... *G03B 17/08* (2013.01); *H01F 7/0242* (2013.01); *H04N 5/2252* (2013.01); *H04N 2005/2255* (2013.01)

(58) Field of Classification Search
CPC ...... H01F 7/0242; G03B 17/08; H04N 5/2252
See application file for complete search history.

(56) References Cited

U.S. PATENT DOCUMENTS

| | | | |
|---|---|---|---|
| 3,860,937 A * | 1/1975 | Wolfe | G03B 17/08 396/27 |
| 3,950,719 A | 4/1976 | Maxwell | |
| 5,369,386 A * | 11/1994 | Alden | H01H 9/042 335/206 |
| 5,694,621 A * | 12/1997 | Dowe | G03B 17/08 396/25 |
| 6,049,265 A | 4/2000 | Haehnel et al. | |
| 7,283,027 B2 | 10/2007 | Batteux et al. | |
| 7,385,645 B2 * | 6/2008 | Boon | G03B 17/08 348/373 |
| 7,623,010 B2 | 11/2009 | Liu | |
| 7,679,674 B2 | 3/2010 | Nishizawa | |
| 7,801,425 B2 | 9/2010 | Fantone et al. | |
| 8,244,118 B2 | 8/2012 | Stansbury | |
| 8,410,876 B2 | 4/2013 | Heckenkamp et al. | |
| 8,723,968 B2 | 5/2014 | Yokota et al. | |
| 9,355,800 B2 * | 5/2016 | Henderson | H01H 36/004 |
| 9,754,739 B2 * | 9/2017 | Honda | H01H 36/00 |
| 2005/0168567 A1 | 8/2005 | Boon | |
| 2017/0094444 A1 * | 3/2017 | Manahan | G08C 17/04 |

FOREIGN PATENT DOCUMENTS

CN    101055818 A    10/2007

* cited by examiner

*Primary Examiner* — Bernard Rojas
(74) *Attorney, Agent, or Firm* — Michael J. Feigin, Esq.; Feigin and Fridman LLC

(57) ABSTRACT

A magnetic actuator can be slid in the X and Y direction along a housing or other substrate, and depressed in the Z direction, where desired, activating a button. This is accomplished by way of magnetically engaging one, two, or more ring magnets on either side of the substrate, defining a plane. Central magnets are placed within these ring magnets and can be held in place further by a circumferential sleeve between the central magnet and the ring magnet, as well as between a ring magnet and the substrate. By arranging the polarities of the magnets, the central magnet on one side of the substrate is held away from the substrate, while, on the other side, the central magnet is held against the substrate.

18 Claims, 4 Drawing Sheets

TRIPLE AXIS MAGNETIC ACTUATOR THROUGH NON-METALLIC SUBSTRATE

FIELD OF THE DISCLOSED TECHNOLOGY

The disclosed technology relates generally to magnetic buttons, and, more specifically, to movable push buttons through non-metallic substrates.

BACKGROUND OF THE DISCLOSED TECHNOLOGY

There has been a long-standing problem with the operation of cameras underwater. While specialized underwater cameras, with specialized water proof housings, and with buttons connected via O-rings, are known, this solution is often insufficient. Many of the best cameras, and those with which cinematographers are familiar, work only outside of water. So, no later than the 1970s, specialized housings for cameras were created. While such housings are water-tight, a problem still remains as to a method of controlling the camera. Often, to this day, cinematographers turn on the camera above water, place the camera in the housing and then descend, wasting some of the finite amount of camera battery life and storage space.

To alleviate the problem of controlling a camera underwater, complex couplings have been developed, allowing one to push a button at a specific location. Due to such mechanical couplings passing through housings, the reliability of the liquid tight seals is affected negatively with age and the seals require routine maintenance. Still further, by virtue of the use of mechanical structures for operating the camera, the adaptability of the known devices to different types of cameras is limited.

Therefore, inventors have developed magnetic coupled buttons which work through a waterproof case. One example of this is U.S. Pat. No. 3,860,937 to Wolfe, disclosing a camera with a movable magnet on the outside of the housing to selectively operate an electrical switch. This device functions by aligning one magnet on the outside of a waterproof housing with a magnet in the interior thereof, pulling a switch towards the aligned magnet, thus activating the switch. This concept, while functional, requires a specially shaped camera, housing, and magnets attached to specific positions on a camera.

In another version of a magnetically activated button to control a camera, U.S. Pat. No. 7,385,645 to Boon discloses a concept similar to that of Wolfe. A stationary magnet is placed on a button of a camera, inside a waterproof housing. Another magnet is placed within an enclosed space on the other side of the waterproof housing. Thus, if the device leaks at the position of this button cut into the housing, it will leak only into the outer magnet, and not into the housing, possibly causing damage to the camera itself. Many of the drawbacks of Wolfe, however, remain in this reference because magnets must be fixed to specific buttons on the camera itself. Further, while Wolfe allowed one to position a magnet as a button anywhere on the exterior, Boon requires that the magnet/button be at a pre-set location. Many of today's cameras have large touch-screens providing a further drawback due to the magnet blocking part of the screen.

What is needed is a way to house any camera in a waterproof case, while being able to control any and all buttons on the camera from outside the case, wherever they may be. Preferably, this should be accomplished without having to modify, make permanent changes, or attach further parts to the camera, while neither compromising on the seal around the camera or viewing of a screen on the camera.

SUMMARY OF THE DISCLOSED TECHNOLOGY

The disclosed technology solves the aforementioned problems by providing a three axes or triple axis magnetic actuator. While the prior art is generally directed to one axis (depressing a stationary button), in embodiments of the disclosed technology, the actuator can be slid in the X and Y direction along a housing or other substrate, and depressed in the Z direction, where desired, activating a button. This is accomplished by way of magnetically engaging one, two, or more ring magnets on either side of the substrate, defining a plane. Central magnets are placed within these ring magnets and can be held in place further by a circumferential sleeve between the central magnet and the ring magnet, as well as between a ring magnet and the substrate. By arranging the polarities of the magnets, the central magnet on one side of the substrate is held away from the substrate, while, on the other side, the central magnet is held against the substrate.

Described another way, a first ring magnet with portal and a first central magnet at least partially within the portal of the first ring magnet are used in embodiments of the disclosed technology. This can be used with a second ring magnet with portal, and a second central magnet at least partially within the portal of said second ring magnet. The said first ring magnet and the said second ring magnet are arranged with opposite magnetic polarities pointing towards each other on either side of a non-magnetic substrate. As such, in a resting state, the first central magnet is spaced apart from the non-magnetic substrate, and the second central magnet is closer to the substrate than the first central magnet.

With the above arrangement, in embodiments of the disclosed technology, pressing the first ring magnet towards the substrate causes the second ring magnet to move away from the substrate. Further, movement of a tip can be coupled to the second ring magnet, so that pressing the first ring magnet towards the substrate causes the tip to come in contact with a button. In order to operate, the button may require an electrical impulse, so the substrate can have a conductive surface, such as by way of a transparent conductive coating, creating a conductive path between at least some parts of the three-axis magnetic actuator on either side of the substrate and the button.

The three axis-magnetic actuator also has, in some embodiments, at least one L-shaped sleeve (when viewing a vertical cross-section thereof). This L-shaped sleeve can be situated between the first ring magnet and the first central magnet, or the second ring magnet and the second central magnet. It is also, in embodiments, situated between either the first ring magnet and the substrate, or the second ring magnet and the substrate. Two different L-shaped sleeves can be used, each one encompassing one of the eventualities separated by the term "or."

An H-shaped housing (when viewing a vertical cross-section) bifurcating at least one of the first central magnet and the second central magnet, is included in some embodiments of the disclosed technology. A button, in embodiments, is fixed to the movement of the first central magnet, having a length that is transverse to a direction of the pressing/movement of the central magnets through the ring magnets, which is greater than that of the central magnet and the first ring magnet. The three-axis magnetic actuator can have 360 degrees of rotational symmetry.

Said yet another way, in embodiments, the connector has at least two central magnets with a same polarity facing towards a plane (which can be defined by a substrate, such as a side of waterproof housing) between the at least two central magnets. At least two ring magnets, each at least partially surrounding one of the at least two central magnets, is then used in embodiments of the disclosed technology. A first such ring magnet is positioned on one side of the plane, and a second ring magnet on the other side of the plane. The first and the second ring magnets have an opposite polarity facing towards each other, as well as the afore-described plane. The first and second ring magnets are also magnetically coupled in embodiments. "Magnetically coupled" is defined as "held together by magnetic forces, including those magnetic forces extending through non-magnetic objects."

The at least two central magnets can be bifurcated. The at least two central magnets can be spaced apart in a resting condition and movable with respect to the at least two ring magnets, such that when a first of the central magnets is pushed in a direction of the plane, a second of the central magnets moves away from the said plane while remaining magnetically coupled to a ring magnet. Each central magnet can be coupled to a non-magnetic button (including a "button" to depress and a "tip" which engages another button).

In the above as well as further embodiments, a method of using a three-axes magnetic actuator can include steps of magnetically engaging two ring magnets on either side of a plane, and positioning at least one central magnet within each ring magnet, such that a first central magnet is positioned within one of the ring magnets. This central magnet is aligned with (touching) the plane, and a second central magnet is spaced apart from the plane. The magnetic actuator is then slid along the plane. At least one central magnet spaced apart from the plane is then depressed towards the plane, causing said at least one central magnet to move away from said plane.

Upon the least one central magnet becoming misaligned (from its respective ring) and moving away from the plane, a tip fixedly connected to, and movable with respect to, the central magnet which has become misaligned, engages a button. This button can be a touch-screen requiring an electrical impulse for engagement, the electrical impulse being passed from a person through the tip and around a housing/substrate to the other side thereof, to the touch screen. The plane may be bifurcated (cut through) by a substrate spacing apart the ring magnets on either side of the plane, the substrate being a waterproof housing. Thus, the "plane" and "substrate" become synonymous, except that the "substrate" is wider than a two-dimensional mathematical plane.

The sliding described above can be limited by a lip extending from the plane (that is, planar substrate) of the waterproof housing. The lip can have within it an arc of a circle with a radius of less than 10% more than that of each ring magnet, so that a three-direction magnetic actuator can be placed with the arc.

"Substantially" and "substantially shown," for purposes of this specification, are defined as "at least 90%," or as otherwise indicated. Any device may "comprise" or "consist of" the devices mentioned there-in, as limited by the claims.

It should be understood that the use of "and/or" is defined inclusively such that the term "a and/or b" should be read to include the sets: "a and b," "a or b," "a," "b."

DETAILED DESCRIPTION OF EMBODIMENTS OF THE DISCLOSED TECHNOLOGY

Embodiments of the disclosed technology include a magnetic actuator that can be slid in the X and Y direction along a housing or other substrate, and depressed in the Z direction, where desired, by activating a button. This is accomplished by way of magnetically engaging one, two, or more ring magnets on either side of the substrate, defining a plane. Central magnets are placed within these ring magnets and can be held in place further by a circumferential sleeve between the central magnet and the ring magnet, as well as between a ring magnet and the substrate. By arranging the polarities of the magnets, the central magnet on one side of the substrate is held away from the substrate, while, on the other side, the central magnet is held against the substrate.

Embodiments of the disclosed technology will become clearer in view of the following discussion of the figures.

Figure 1:
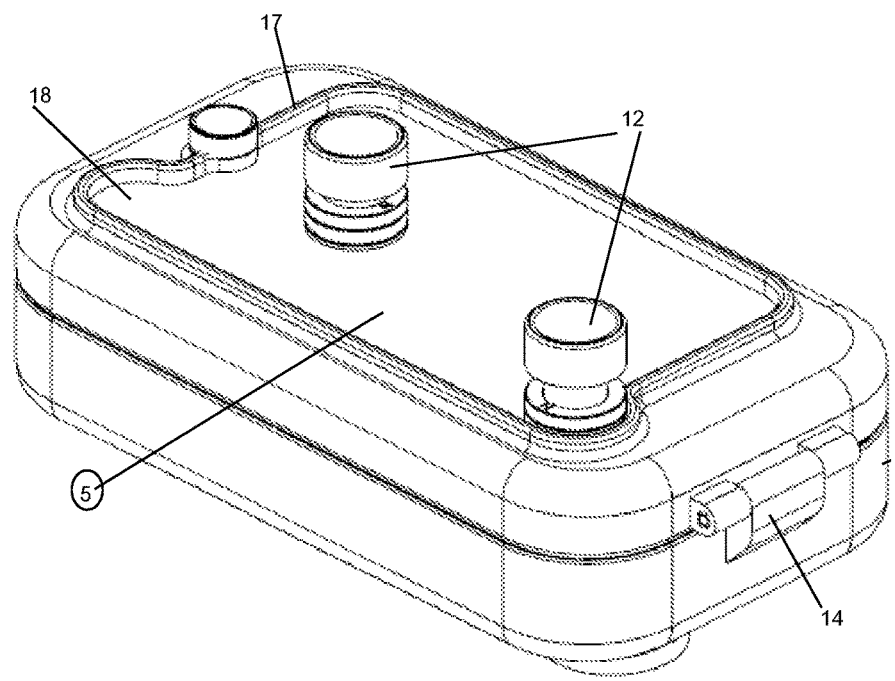
FIG. 1 shows a top perspective view of a camera housing with magnetic actuators, in embodiments of the disclosed technology.

FIG. 1 shows a top perspective view of a camera housing with magnetic actuators, in embodiments of the disclosed technology. A water-tight and sealable camera housing 5 (or "substrate") is shown which closes by way of hinge 14. Such housings are known in the art, and, in fact, prior art housings may be used in conjunction with embodiments of the disclosed technology. The housing 5 can be any housing which is water-tight. In embodiments, the housing is further translucent, or substantially transparent, and can have a coating which transmits electrical impulses. That is, the housing, or at least one side thereof, may be conductive or have a conductive layer. One, or a plurality of, magnetic actuators 12 is held, via forces of magnetic attraction, to either side of a non-metallic and/or non-magnetic and/or non-conductive substrate 5. The non-conductive substrate may, however, have a conductive coating which extends between the sides of a magnetic actuator 12, so as to pass (conductive) current from one side of a magnetic actuator 12 to the other.

Figure 2:
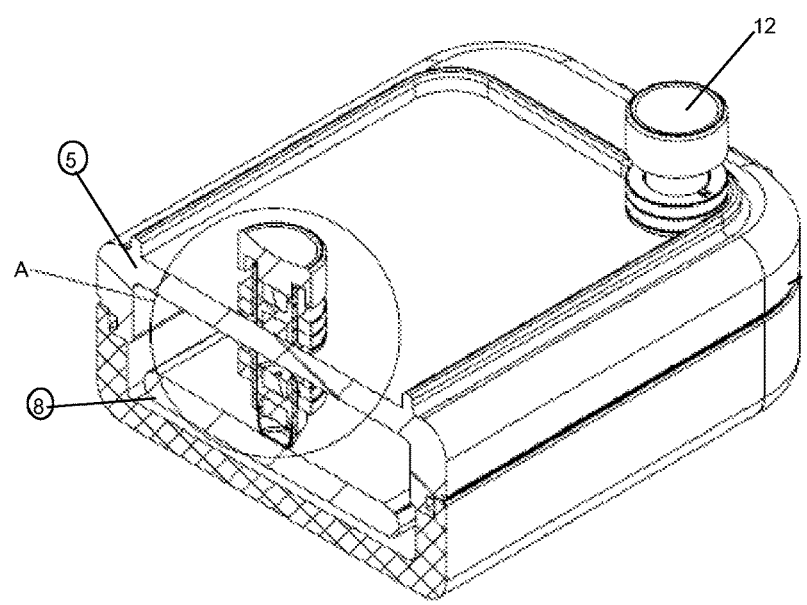
FIG. 2 shows a cutaway view of the camera housing and one of the magnetic actuators of FIG. 1.

FIG. 2 shows a cutaway view of the camera housing and one of the magnetic actuators of FIG. 1. The magnetic actuator 12 extends through either side of the substrate 5. Multiple magnetic actuators can be used and slide longitudinally with respect to the planar surfaces of the substrate 5. A camera 8 is placed between each or the solo actuators and the housing. As such, by pressing down on a magnetic actuator 12, a button is pressed against the camera 8 at any point along an X or Y axis of the camera. Therefore, any button, anywhere on this side of the camera, may be pressed from outside of the water-tight housing, without any parts interrupting the body of the housing 5. This can be used, not only for buttons on the camera, but for touching any place on the camera, such as when using touch-screen devices.

However, touch-screen devices require transmission of electrical impulses from a person. This electrical impulse interrupts an electrical field extending across the screen in both the X and Y directions (for example) to determine the point of touch. Here, the exterior of the magnetic actuator, from a top-most to bottom-most point, is conductive, as is at least the surface of the housing/substrate 5. Thus, an electrical impulse from a person using the magnetic actuator, by depressing same, is transmitted to the surface of a touch screen device 8, in embodiments of the disclosed technology.

Figure 3:
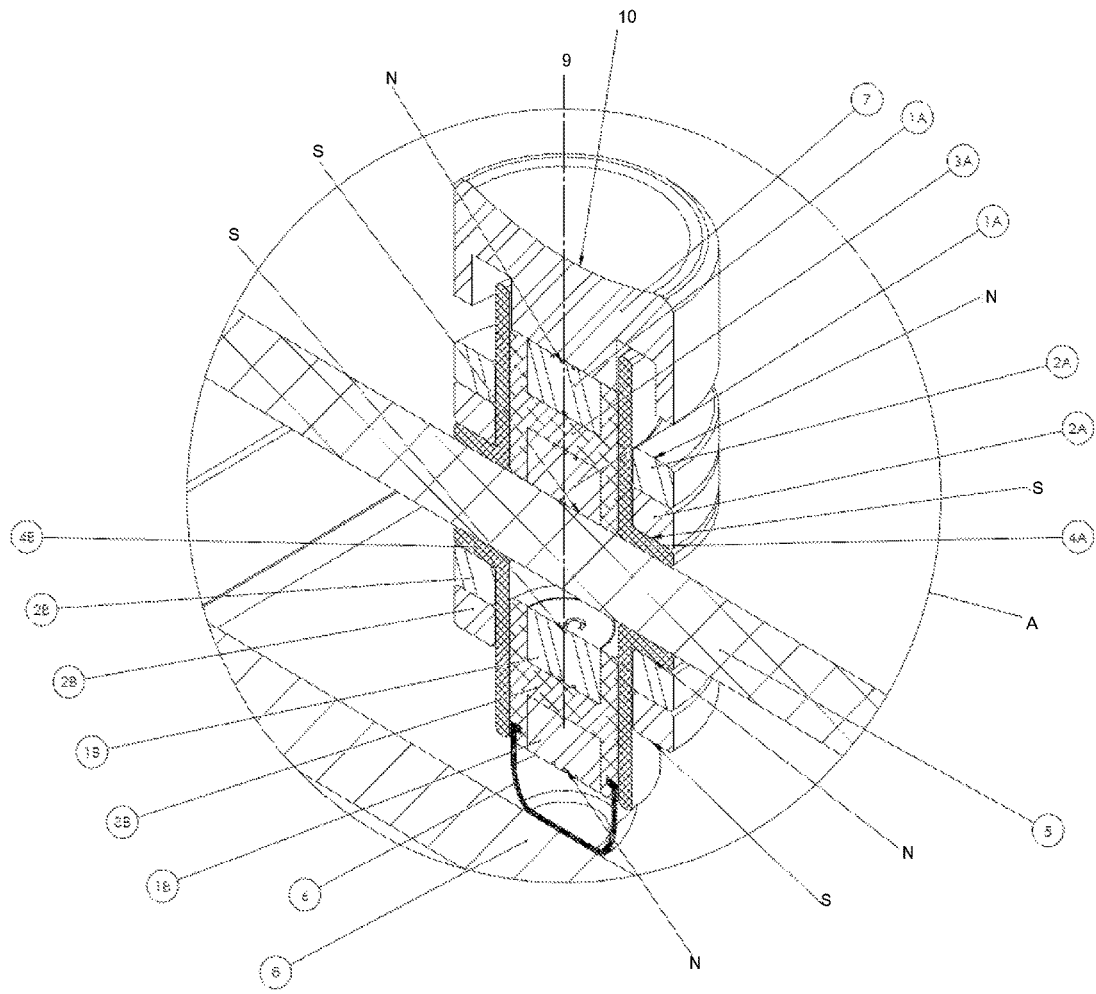
FIG. 3 shows a magnified view of the magnetic actuator shown in inset A of FIG. 2.

FIG. 3 shows a magnified view of the magnetic actuator shown in inset A of FIG. 2. Those numbers which are circled describe parts of the device itself, while those numbers and letters which are not circled will aid in understanding aspects of the device. Numeral 9 refers to a vertical line of symmetry and/or a central radial line of symmetry of the top and bottom portions of the actuator 12, around which the entire actuator is rotated. Numeral 10 refers to the direction in which pressure is applied to the push tip 6 to activate a switch. Finally, the "N" and "S" designations refer, throughout the drawings, to the magnetic orientation of each magnet. It should be understood that the "N" and "S" designations are by way of example and that every such designation could be reversed. That is, each "N" can refer to a north magnetic pole of a magnet, and each "S" can refer to a south magnetic pole of a magnet. Or, each "N" can refer to a south magnetic pole and each "S" can refer to a north magnetic pole. Throughout the descriptions of embodiments of the disclosed technology, the former convention will be used, for obvious reasons. Referring still to the numbering conventions used, any number given a suffix of "A" or "B" has a corresponding part on the reverse side of substrate 5. Those items with the suffix "A" are on the operator end of a magnetic actuator which are, in embodiments, outside of a camera housing. Those items with the suffix "B" are on the surface contact side of the substrate 5. The "surface contact" side is between the substrate 5 and a device, such as a camera or touchscreen which is pressed, which can all be within an airtight sealed environment.

Referring still to FIG. 3, a non-magnetic substrate 5 is placed between an operator end of a magnetic actuator (above the substrate in FIG. 3) and a surface contact side of the magnetic actuator (below the substrate in FIG. 3). The device functions, in part, by the use of repulsive magnetic forces to push a button 7 away from the substrate 5. This button can be made of rubber or metal and can be conductive, in embodiments of the disclosed technology. A center magnet 1A is pressed against the substrate 5, causing a center magnet 1B, which was pressed against the substrate 5, to be repelled away from the substrate (FIG. 3 shows the device in a depressed condition.)

However, in order to repel magnets from others on either side of the substrate, one must be able to push the tip 6 and magnet 1B away from the substrate 5 which are still maintaining magnetic connection between the two halves of the actuator on either side of the substrate. This is accomplished by at least one set of ring magnets 4A and 4B non each side of the substrate, which maintain magnetic engagement with each other and remain, in embodiments of the disclosed technology, pressed against the substrate 5 when pressure is applied in direction 10, causing the tip 6 to engage with a surface 8. In some embodiments, a second set of ring magnets 2A and 2B is also used, having a direction of polarity facing opposite that of the first set of ring magnets. Poles on a second set of ring magnets can be in the same alignment. Any number of stacked ring magnets may be used on either side, such as 1 (on one side) and 1 (on the other side, 1 and 2, 2 and 1, 2 and 2, 3 and 1, 3 and 2, or 3 and 3.

The ring magnets further magnetically engage with the center magnets 1A and 1B. In a resting condition, one center magnet 1A is held away from the substrate 5 by magnetic forces pulling on it from the ring magnet(s) 2A, while another center magnet 1B is held against (touching) the substrate 5 by magnetic forces pushing on it from the ring magnet(s) 2B.

In still further embodiments, an H-shaped housing 3A and/or 3B is used. This H-shaped housing has two portals on either side of the vertical midpoint of the "H" which bifurcates the center magnet(s) 1A and/or 1B into two portions. A first portion of the center magnet 1A and/or 1B (on either side of the substrate) is held between the vertical midpoint of the respective H-shaped housing 3A or 3B and the substrate 5. A second portion of the center magnet 1A and/or 1B is held between the vertical midpoint of the respective H-shaped housing 3A or 3B and a non-magnetic cover. The non-magnetic cover for the center magnet 1A can be a push button 7 shaped for easy pushing, such as by having a dimpled surface and/or size larger than the center magnets, so as to allow easier pushing by providing a greater surface area than a furthest extent of the center magnet 1A. The non-magnetic cover for the center magnet 1B can be a tip 6 which, at a most distant extent away from the substrate 5, has a lesser surface area than that of the furthest corresponding extent of the magnet 1B. This top 6 can be rubber, metal, or any other resilient material, and can be conductive, or have a conductive surface, in embodiments of the disclosed technology.

In some embodiments, a sleeve 4A and/or 4B is situated between inner elements and the ring magnets 2A and/or 2B. The "inner elements" are defined as "center magnet 1A and/or 1B, and/or the H-shaped housing 3A and/or 3B. This sleeve 4A and/or 4B can be L-shaped, extending directly between a ring magnet 2A or 2B and the substrate 5. Thus, this L-shaped sleeve 4A and/or 4B contacts the substrate 5, while the ring magnet(s) 2A and 2B are held together by magnetic force extending through the substrate 5 and at least one sleeve 4A and/or 4B. The sleeve 7A and/or 7B can also engage/connect with, add structural support to, or hold the non-metallic cover, and/or provide a stop for the non-metallic cover 6 or 7, preventing it from extending too close or far from the substrate 5.

Figure 4:
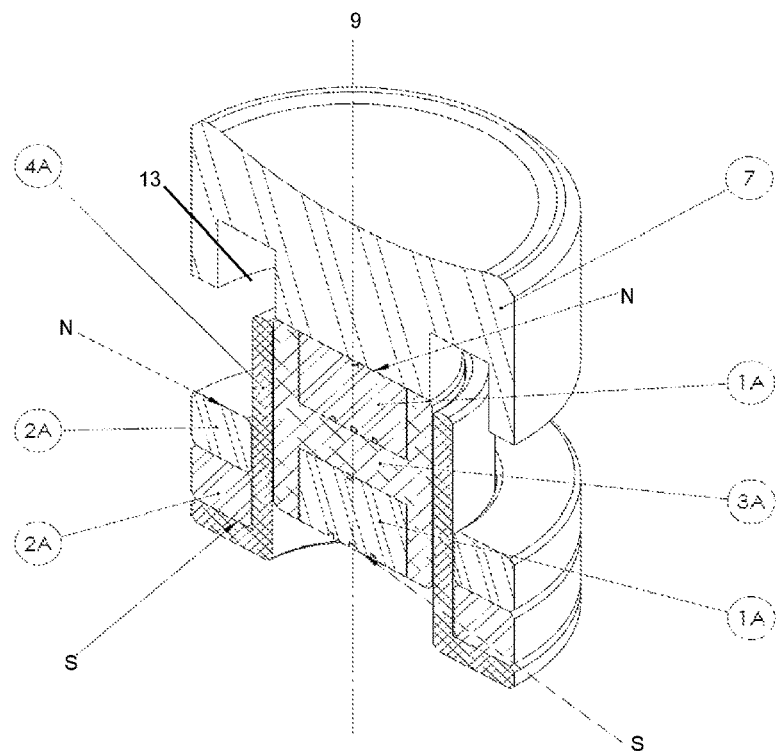
FIG. 4 shows a further magnified view of the operator end of the magnetic actuator shown in FIG. 3.

Moving on to FIGS. 4 and 5, the individual sides of the actuator will be described in more detail. FIG. 4 shows a further magnified view of the operator end of the magnetic actuator shown in FIG. 3. The operator end of the actuator 12 is shown in a resting state, with the center magnet 1A spaced apart from the lower portion of the "L" of the sleeve 4A. This creates an air pocket between the center magnet 1A and the substrate 5 or other item which the lower L of the sleeve 4A is pressed against or rests on. The magnet(s) 1A and H-shaped housing 3A are slidably movable along the housing 4A and/or transverse to the circular shape of the ring magnet(s) 2A. In the resting position, the center magnet(s) 1A are held adjacent to the side of the lowest ring magnet 2A, which is furthest away from the substrate/bottom of the "L."

A button 7 can be used to extend both the reach (direction of movement of the inner magnet 1A, herein defined as "vertical") of the inner magnet(s) 1A. Further, the button 7 can extend the horizontal width (transverse to "vertical" and/or the direction defined by the plane passing through all points of a circle and portal of one of the circular magnets 2A). The button can also have portals 13 (such as a single circular portal) cut there-in to allow vertical movement upwards and downwards over the sleeve 7.

The magnetism of the user-operated side of the actuator two-ring magnets used along with a center magnet which is divided into two portions, bisected by the H-shaped housing 3A and two-ring magnets 2A, will now be described. This is the embodiment shown in FIG. 4. Here, the term "upper" or "top" is defined as "the furthest extremity from the substrate 5" and/or "at the most vertical extent of the button 7 away from the center magnet 1A." The term "lower" or "bottom" is defined as "closest to the substrate 5" and/or "at an extent furthest from the top."

The lower ring magnet has a south polarity facing towards the bottom and a north polarity facing towards the top. The upper ring magnet has a polarity opposite this, so that the ring magnets attract. As such, the top-most extent of the ring magnets has a polarity of north, and the bottom-most extent has a polarity of south, whether one or two ring magnets 2A are used. The center magnet 1A has a polarity of south at the lowest extent and a polarity of north at the uppermost extent. When the H-shaped housing 3A or another non-metallic substrate bifurcates the center magnet 1A, then the two center magnets 1A remain with the same individual polarities. Thus, in a resting condition, the center magnet 1A is held away from the lowest extent and adjacent to the top of the lowest ring magnet 2A, because the south polarity of the strongest magnetic attraction between the center magnet 1A and lowest ring magnet 2A is at the lower side of the center magnet (S) 1A and upper side of the ring magnet 2A (N). While this magnetic attraction can be overcome by force applied downwards on the button 7, this then puts the lowest side of the center magnet (S) adjacent to the lowest side of the ring magnet 2A (S). As soon as the pressure applied to the button 7 in a vertical and downwards vector is removed, the center magnet 1A returns to the resting position.

Figure 5:
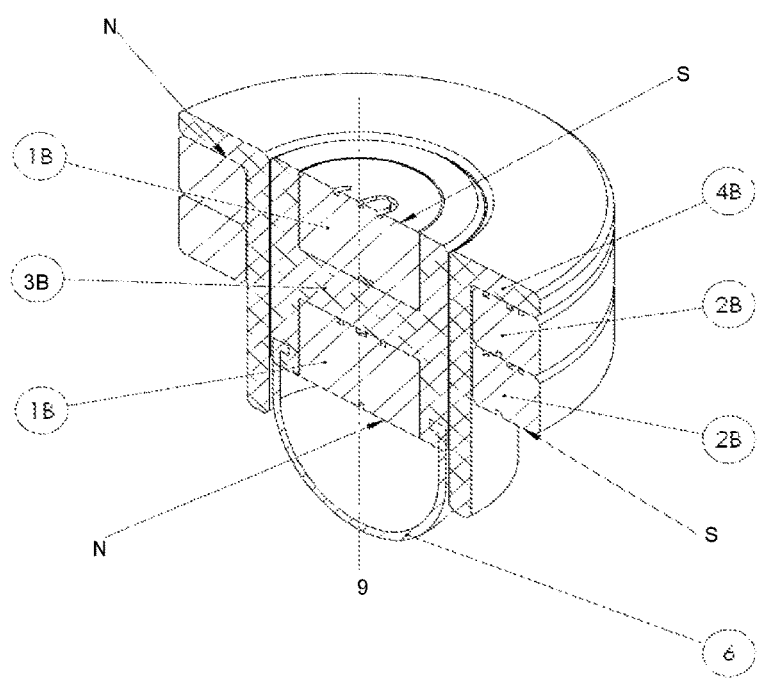
FIG. 5 shows a further magnified view of the surface contact side of the magnetic actuator shown in FIG. 3.

FIG. 5 shows a further magnified view of the surface contact side of the magnetic actuator shown in FIG. 3. The same definitions used above with reference to FIG. 4 apply to FIG. 5, except that the button 7 is replaced with a tip 6, and the spaced apart state of a magnet with respect to the substrate occurs in the depressed state, instead of the resting state. It should further be understood that the terms "top" and "bottom" used in the prior figure are likewise being used to describe what is shown in FIG. 5 and the surface contact side of the magnetic actuator, but that "top" and "bottom" are flipped 180 degrees, as the terminology is relative to the position of the substrate which is between the two "bottoms" of each side of the actuator. In FIG. 5, the surface contact side of the magnetic actuator is shown in a resting state. The substrate 5, not shown in the figure for clarity, is being rested against by the sleeve 4B (or, in alternative embodiments, directly by a ring magnet 2B where a sleeve is not used).

The surface 8 (shown in other figures is contacted by a tip 6 extending past the inner magnet 1B and/or the sleeve 4B. The tip 6 can be fixedly attached to, or form a unitary structure with, either of the inner magnet 1B or the H-shaped housing 4B and moves with the inner magnet 1B. That is, the H-shaped connector 43 or, at least, an inner magnet 1B housed within a portal of a ring magnet 2B, must be movable with respect to the ring magnet 2B. Descriptions of the elements of the H-shaped housing, L-shaped sleeve, ring magnet(s), and center magnet(s), as well as quantities of each, (as described with reference to prior figures) are applicable to such elements on the surface contact side of the magnetic actuator, as well.

The resting state of the surface contact side of the magnetic actuator can be with a central magnet 1B parallel, or substantially parallel. to a bottom of an L-shaped sleeve 4B and/or lowest ring magnet 2B. That is, in the resting state, the central magnet 1B touches the substrate 5 and/or no perceivable or substantially (greater than 2 mm) space exists between the substrate 5 and the lowest central magnet 1B. This resting state is due to the following polarities. The central magnet(s) 1B have a south polarity at its bottom-most end and a north polarity at its top-most end. The ring magnet(s) 2B have a north polarity at the top-most end and a south polarity at the bottom-most end. As such, when the center magnet is placed at an interior of the ring magnet(s), it will remain with the bottom side of the center magnet 1B (S) adjacent to the bottom side of the ring magnet 2B (N). The tip 6, which moves with the center magnet 1B, is then held in a down position, with respect to the substrate (or "up" with respect to a press of a camera, touch screen, or button to be depressed by the tip 6).

Now describing the magnetic forces with respect to FIGS. 4 and 5 simultaneously, when the button 7 is depressed with enough strength to overcome the magnetic forces of attraction between the center magnet 1A and ring magnet 2A, the center magnet is moved towards the substrate 5/bottom of the user-operated side of the magnetic actuator. The bottom side of the center magnet 1A now has a south magnetic pole directly against the substrate. On the other side of the substrate, in the resting condition, the south magnetic pole of the center magnet 1B of the surface contact side of the actuator is directly adjacent to the south magnetic pole of center magnet 1B. The repulsive forces of the center magnets 1A and 1B, with respect to one another, cause center magnet 1B to move upwards and away from both center magnet 1A and the substrate 5, as the direct repulsive forces are stronger than the forces of attraction between the ring magnet 2B and center magnet 1B, which are attracted by a weaker magnetic force, relative to the repulsive force between magnets 1A and 1B. This weaker magnetic force can be created in any number of ways, such as by varying the strength of the ring magnet 2B, varying the distance between the center magnet 1B and ring magnet 2B, or simply by using the same distance and strength magnets (1B and 2B vs. 1A and 1B), but having magnets 1A and 1B be directly against each other, whereas magnets 1B and 2B are aligned with magnetic forces in parallel, instead of directly against each other.

Referring now to the figures in general, when center magnet 1A is pressed towards center magnet 1B, the repulsive forces push the center magnet(s) 1B and, in embodiments, the H-shaped housing 3B, away, causing the top 6 to move downwards. The distance between the top-most portion of the top 6 and a camera/touch-screen/button 8 (see FIG. 2 or 3) is less than, or equal to, the distance of movement of the center magnet 1A and the substrate 5. As such, the distance of movement of the button 6 is enough, when the button 7 is depressed, to make contact with the surface 8.

Referring still to the figures in general, and especially FIG. 2, while a physical button can be moved on the surface 8, the surface 8 can be a touch-screen, as previously described. Therefore, it is the touch of the tip 6 on the surface 8 which activates a button. However, many touch-screens work via interrupting electrical conductivity on the screen, with electrical impulses present on the exterior of the body of the presser. Therefore, a physical touch of the screen is ineffective on such screens. To overcome this problem, a conductive spray and/or conductive material can be used, so that at least, or only, the exterior surface of any of the following are conductive: the button 7, the L-shaped sleeve 4A and/or 4B, the H-shaped housing 3A and/or 3B, the tip 6, the substrate 5 of the housing, and/or any of the magnets. In embodiments, all central magnets, or at least one on each side of the substrate 5, are of equal size. In embodiments, all ring magnets are of equal size.

It should now be appreciated that the magnetic actuators 12 shown in FIG. 1 can be slid in any direction along the surface of a substrate 5, such as the camera housing shown. One can use multiple actuators to push more than one button at once, or leave an actuator 12 over a specific button for easy access to such a button (or position of a touch-screen) while moving the other actuator, as needed. Indents 18 having a circular arc less than 5%, 10% or 15% greater than the circumference of the ring magnets of the actuator, positioned on the substrate 5, can define part of a raised lip 17 in which the actuators 12 can move longitudinally. The raised lip, in embodiments, is a closed polygon. An actuator 12 can then be placed in an indent 18 to be at an edge, most out of the way of blocking view of a camera/screen held there-in.

Figure 6:
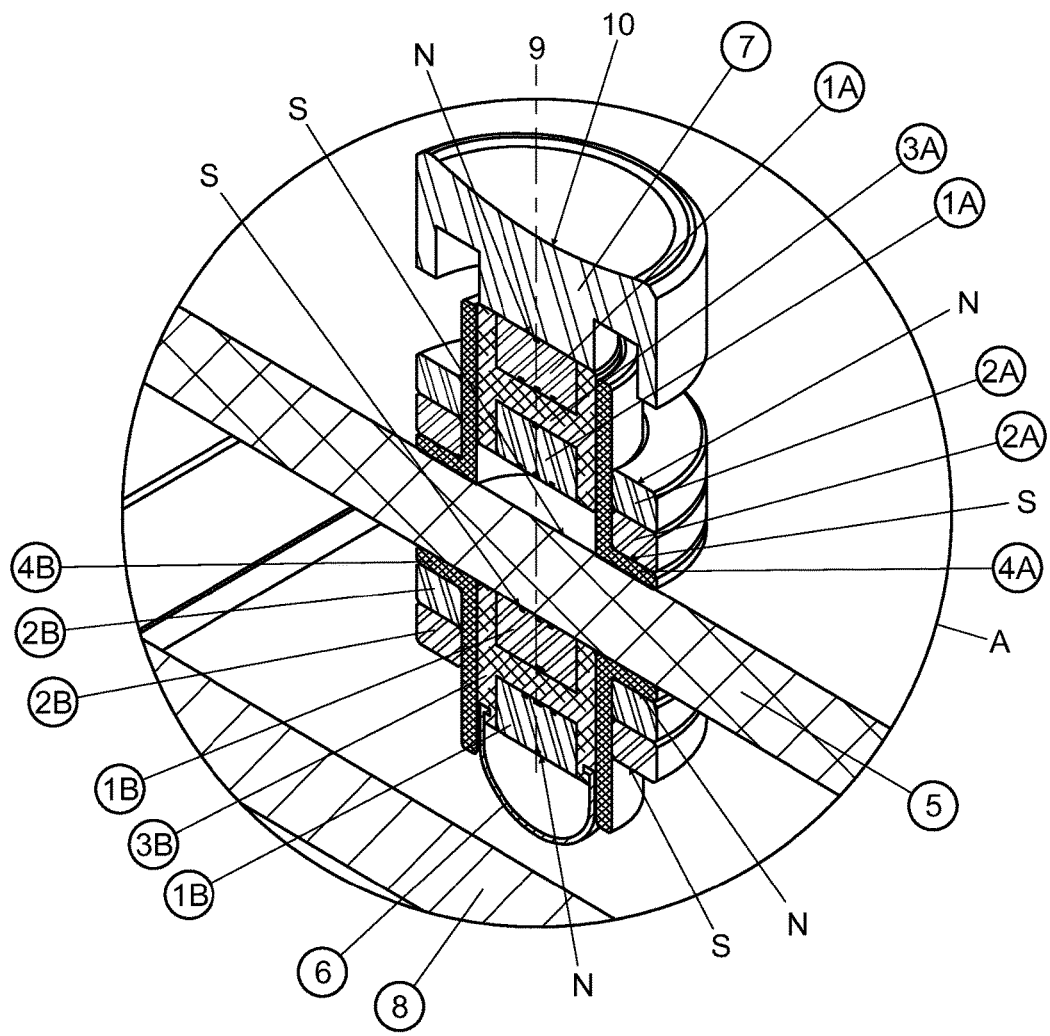
FIG. 6 shows a magnified view of a magnetic actuator shown in a resting state.

FIG. 6 shows a magnified view of a magnetic actuator shown in a resting state. The resting condition of each of the magnets is shown in FIG. 6. In the resting state, a first central magnet is spaced apart from the non-magnetic substrate and a second central magnet is closer to the substrate than the first central magnet. It can also be seen when viewed in conjunction with FIG. 3 that pressing the first ring magnet towards the substrate causes the second ring magnet to move away form the substrate. Further, the substrate can have a conductive surface.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A three-axis magnetic actuator comprising:
   a first ring magnet and a first central magnet at least partially within a ring of said first ring magnet;
   a second ring magnet, and a second central magnet at least partially within a ring of said second ring magnet;
   said first ring magnet and said second ring magnet arranged with opposite magnetic polarities pointing towards each other on either side of a non-magnetic substrate;
   wherein in a resting state, said first central magnet is spaced apart from said non-magnetic substrate, and said second central magnet is closer to said non-magnetic substrate than said first central magnet.

2. The three-axes magnetic actuator of claim 1, wherein pressing said first ring magnet towards said non-magnetic substrate causes said second ring magnet to move away from said substrate.

3. The three-axes magnetic actuator of claim 2, wherein a tip moves with said second ring magnet, and pressing said first central magnet towards said non-magnetic substrate causes said tip to come in contact with a button.

4. The three-axes magnetic actuator of claim 3, wherein said non-magnetic substrate comprises a conductive surface creating a conductive path there-through.

5. The three axes-magnetic actuator of claim 1, further comprising at least one L-shaped sleeve frictionally held between said non-magnetic substrate and one of said first ring magnet and said second ring magnet.

6. The three-axis magnetic actuator of claim 5, further comprising an H-shaped housing bifurcating at least one of said first central magnet and said second central magnet.

7. The three-axes magnetic actuator of claim 2, further comprising a button fixed to movement of said first central magnet.

8. The three-axes magnetic actuator of claim 1, wherein said three-axis magnetic actuator has 360 degrees of rotational symmetry.

9. A three-axes magnetic actuator comprising:
   at least two first magnets with a same polarity facing towards a plane between said at least two first magnets; and
   at least two ring magnets each at least partially surrounding one of said at least two first magnets, a first said ring magnet on one side of said plane and a second said ring magnet on the other side of said plane, said first and said second ring magnets having an opposite polarity facing towards each other and said plane;
   wherein said first and second ring magnets are magnetically coupled.

10. The three-axes magnetic actuator, wherein each of said at least two first magnets are bifurcated.

11. The three-axes magnetic actuator, wherein said at least two first magnets are spaced apart in a resting condition and movable with respect to said at least two ring magnets, such that when a first of said first magnets is pushed in a direction of said plane, said second of said central magnets moves away from said plane while remaining magnetically coupled to said other ring magnet.

12. The three-axes magnetic actuator, wherein each first magnet is coupled to a non-magnetic button or tip.

13. A method of using a three-axes magnetic actuator, comprising the steps of:
   magnetically engaging two ring magnets on either side of a plane;
   positioning at least one first magnet within each ring magnet, such that a first said at least one first magnet positioned with a first of said two ring magnets is aligned with a side of a respective said ring magnet closest to said plane, and a second said at least one first magnet is spaced apart from said plane;
   sliding side magnetic actuator along said plane;
   depressing said at least one first magnet spaced apart from said plane towards said plane, causing said at least one first magnet aligned with said side of said respective said ring to become misaligned and move away from said plane.

14. The method of claim 13, wherein upon said at least one first magnet becoming misaligned and moving away from said plane, a tip fixedly connected to one of said two first magnets and movable with respect to said at least one first magnet, engages a button.

15. The method of claim 14, wherein said button engaged in a touch-screen requiring an electrical impulse for said engaging; and
   said electrical impulse is passed from a person through said tip to said touch-screen.

16. The method of claim 13 wherein said plane is bifurcated by a substrate spacing apart said ring magnets on either side of said plane, and said substrate is a waterproof housing.

17. The method of claim 16, wherein said sliding is limited by a lip extending from said plane of said waterproof housing.

18. The method of claim 17, wherein said lip comprises an arc of a circle with a radius of less than 10% more than that of each said ring magnet.

* * * * *